United States Patent
Pazini et al.

(10) Patent No.: US 12,524,473 B2
(45) Date of Patent: Jan. 13, 2026

(54) SIMULATION AIDED SENSOR ARRAY OPTIMIZATION

(71) Applicant: Dell Products L.P., Round Rock, TX (US)

(72) Inventors: Marcus Vinicius Libardi Pazini, Caxias do Sul (BR); Vinicius Michel Gottin, Rio de Janeiro (BR); Herberth Birck Fröhlich, Florianópolis (BR)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/624,213

(22) Filed: Apr. 2, 2024

(65) Prior Publication Data

US 2025/0307320 A1    Oct. 2, 2025

(51) Int. Cl.
*G06F 16/908*    (2019.01)

(52) U.S. Cl.
CPC .................................. *G06F 16/908* (2019.01)

(58) Field of Classification Search
CPC .................................................... G06F 16/908
USPC ........................................................ 707/705
See application file for complete search history.

(56) References Cited

U.S. PATENT DOCUMENTS

2018/0255023 A1*    9/2018  Whaley ............... H04L 63/0421

OTHER PUBLICATIONS

"Unity," Available: https://unity.com/ [Accessed Feb. 15, 2023].
Nvidia, "Isaac Sim—Robotics Simulation and Synthetic Data Generation," Available: https://developer.nvidia.com/isaac-sim [Accessed Feb. 15, 2023].
"Ansys," Available: https://www.ansys.com/ [Accessed Feb. 15, 2023].
"Siemens Abaqus," Available: https://www.siemens.com/global/en/products/automation/topic-areas/simulation-for-automation.html. [Accessed Feb. 15, 2023].

* cited by examiner

*Primary Examiner* — Joshua Bullock
(74) *Attorney, Agent, or Firm* — Workman Nydegger

(57) ABSTRACT

Sensor data is obtained and stored in a database. A data mask is generated that is configured to mask the sensor data to generate masked sensor data. A model is then used as a search space to identify a reduced set of sensors with which to instrument an asset. The model is trained to reconstruct data, within a threshold loss, from the reduced set of sensors that corresponds to data generated from the original set of sensors. This allows for simulations using a reduced set of sensors and the ability to generate sensor data on-demand even if a sensor is not active or deployed.

20 Claims, 8 Drawing Sheets

SIMULATION AIDED SENSOR ARRAY OPTIMIZATION

FIELD OF THE INVENTION

Embodiments of the present invention generally relate to sensor arrays and to simulating sensor arrays. More particularly, at least some embodiments of the invention relate to systems, hardware, software, computer-readable media, and methods for determining a type and or position of sensors for a system prior to deployment and for augmenting and/or reconstructing sensor data.

BACKGROUND

Virtual entities such as digital twins are useful tools for monitoring/simulating real-world systems and processes. Digital twins often function more efficiently when real-world data is available. Thus, the need for data acquisition via sensor instrumentation is an important aspect of real-world systems. Assets, however, can be instrumented with a wide variety of sensors. In fact, it is possible to measure virtually any feature of an asset as long as the appropriate sensor is installed.

Notwithstanding this ability, deploying sensors to measure all features of an asset may not be the best choice for several reasons. Instrumenting an asset with an inclusive array of sensors can be expensive. The accompanying maintenance/replacement requirements add to the cost. Further, heavily instrumenting an asset becomes increasingly cumbersome on a large scale as the cost is multiplied by the number of assets to be instrumented. In addition to the cost of instrumenting the assets, acquiring, storing, and processing data from large numbers of sensors from large numbers of assets can be a liability in terms of computing power and cost.

Although principal component analyses and other types of dimensionality reduction exist, these methods are applied with no constraints and are generally configured to reduce the size of the original data. Technologies for reconstructing missing data and stochastic optimization heuristics such as variational auto encoders (VAE) may also be used in this context. However, these technologies do not address the manner in which the data reduction is generated or the manner in which data is combined to output a restricted feature space.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
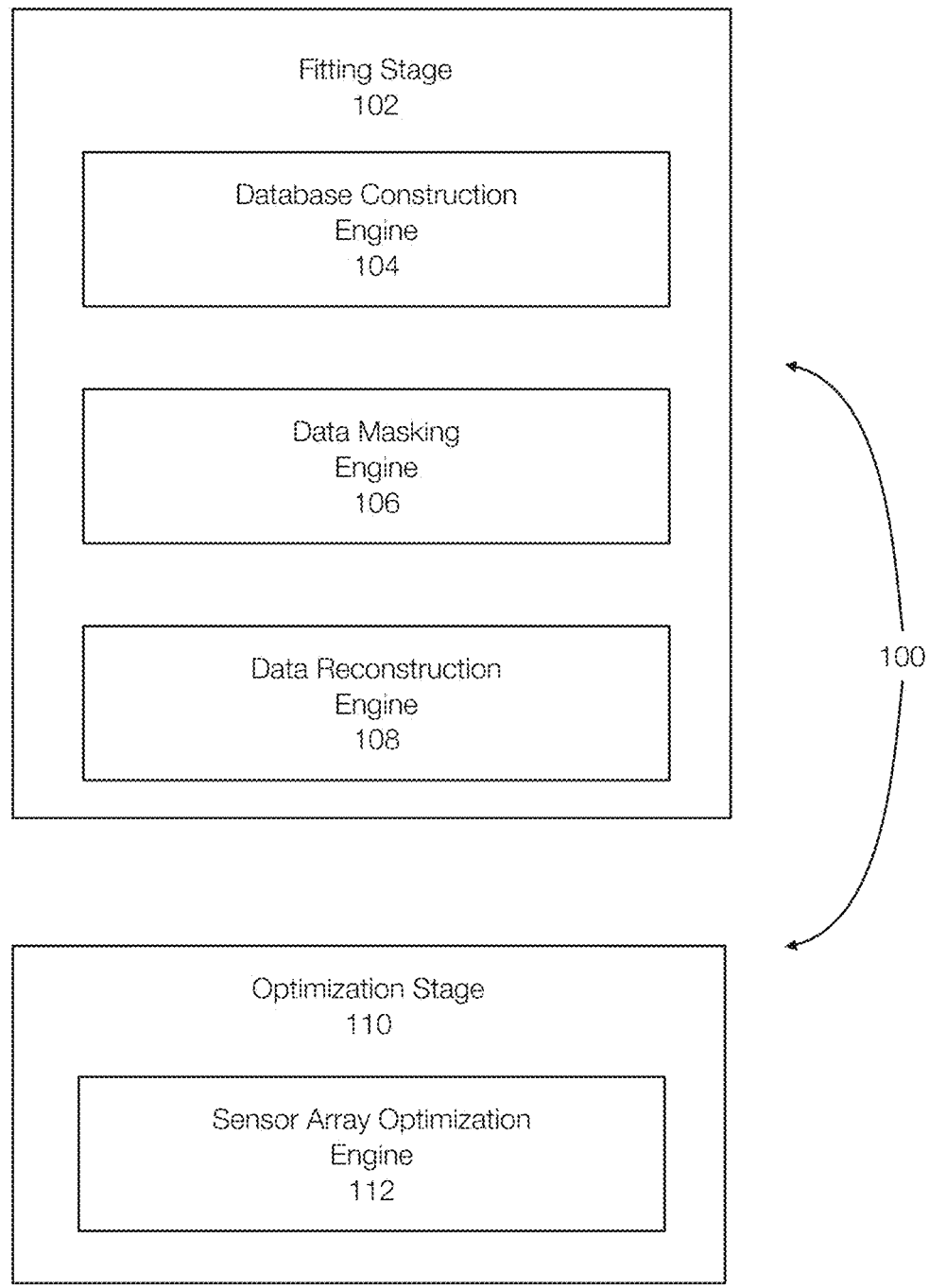
FIG. 1 discloses aspects of an optimization system for optimizing or improving sensor deployment, sensor selection, and data augmentation.

Embodiments of the present invention generally relate to sensor arrays, sensor array deployments and on-demand data generation. More particularly, at least some embodiments of the invention relate to systems, hardware, software, computer-readable media, and methods for, prior to deployment, determining a number, type, and positioning of sensors in an environment or with respect to assets in the environment.

Embodiments of the invention more specifically relate to optimizing asset instrumentation for data collection, asset monitoring, and digitalization of physical systems and further relate to a service configured to generate data, generate/reconstruct estimated data (e.g., missing data), or the like and may be employed in virtual entities such as digital twins.

Digital twins can be configured to accurately represent real world environments. For digital twins to be effective, data acquisition (e.g., via sensor instrumentation on assets) is an important task because digital twins rely on data to perform simulations. Embodiments of the invention are configured to generate data that may be used in digital twin systems.

As previously stated, a large number of sensor types can be installed in an environment, on an asset, or the like. Although virtually any feature of an asset can be measured, sensors are expensive and heavily instrumenting multiple assets can be costly. In addition, acquiring, storing, and processing data from sensors is a liability in terms of cost and computing power.

Embodiments of the invention are able to reduce the cost instrumenting assets and reduce the cost of processing and storing data. Embodiments of the invention are further able to estimate, on demand, data of sensors that missing/inactive in the environment or on the asset. In addition, an instrumented asset can be generated or simulated in a digital twin or other virtual entity with reduced data.

Embodiments of the invention more specifically relate to systems and methods for determining, prior to deployment, an optimal or improved quantity, type, and/or positioning of sensors while also reducing the cost of data acquisition, storage, and processing for digitalization of assets.

Embodiments of the invention may also be configured to provide data augmentation. In one example, data augmentation can be used to combine the acquired data to estimate (on demand) the output of other sensors that are not installed in the asset (or are inactive) via a decoding module or engine.

This ability to augment (or reconstruct) data may be provided as a service in one embodiment. The service may include or use a simulation environment that can replicate the physical world (scene and assets) to reasonable standards, instructions related to how the asset acts in the simulated environment, a function approximator (e.g., a neural network) that can augment or reconstruct the data collected from a lesser instrumented object to one that is fully instrumented, and an optimization method that (near-)

optimally selects the sensors used in a (also simulated) lesser instrumented asset such that the approximation of the data augmentation or reconstruction is improved.

Embodiments of the invention relate to selecting or identifying the features of a complete model can be modelled as a combination of other features. The ability to model a set of features based on a subset of features can be used to reduce or minimize the sensors that may be required because missing data can be reconstructed or augmented based on data generated by or received from the subset of sensors. This advantageously reduces a size of the sensor array. Reducing the size of the sensor array also reduces a size of the data, processing requirements, and storage requirements.

Embodiments of the invention are able to identify sensors whose data is independent of other sensors. By installing only independent sensors, data from other sensors, whose data may not be independent, can be reconstructed or estimated. Thus, embodiments of the invention may suggest the installation or instrumentation of only those sensors whose information or data is independent from all other sensors.

More specifically, many sensors can be viewed as being dependent on other sensors. For example, the values of a position $x(t)$ can be used to calculate velocity $v(t)$ and acceleration $a(t)$. This would suggest that these data or features (position, velocity, and acceleration) can be obtained by installing only a position sensor. Embodiments of the invention may suggest the installation of a position sensor rather than a position sensor, a velocity sensor, and an acceleration sensor. Many other associations between sensors (or features) within a dataset might not be so obvious. Embodiments of the invention discover these associations and thus provide the ability to reduce or minimize the number of sensors that would otherwise be required. This also allows data from missing/inactive sensors to be estimated or reconstructed.

Embodiments thus relate generally to an optimization system that includes various engines (or modules). The optimization system is configured to reduce or minimize a set of sensors (e.g., in number). More specifically, the optimization system may be able to evaluate a set of features to be measured and identify a minimum or optimal set of sensors needed to measure the set of features. This can reduce cost by omitting sensors whose data can be derived or inferred from the data of other sensors. The optimization sensor may also perform data augmentation whenever data is missing in a database or on-demand, and/or generate digitalization of assets with minimal or reduced data acquisition.

FIG. 1 discloses aspects of an example optimization system. The optimization system is configured, in one example, to aid in determining the sensors to include in a sensor array prior to deployment, to perform data augmentation, or provide on-demand data estimation. The optimization system 100 includes a fitting stage and an optimization stage 110. These stages may be performed independently of each other.

The fitting stage 102 is generally configured to generate data (e.g., a database storing synthetic data) and train a machine learning model for augmenting/reconstructing data. The trained model may also serve as a search space that is used to identify sensors to include in a reduced or minimal sensor array. The database construction engine 104 relates to a simulation environment for generating a synthetic array of sensor data using multiple simulated sensors. Simulation scenarios may provide or generate sensor signals such that a database of sensor array data corresponding to a sensor array may be generated.

The data masking engine 106 is an example of a masking tool configured to select instances of sensor data from the synthetic database and set some of the sensor data to zero. The masking tool can generate data that may reflect missing data, missing sensors, or the like. The data masking engine 106 may mask the sensor data in different manners. For example, the data masking engine 106 may mask sensor data randomly, in a row-wise manner, or the like. The data masking engine 106 may create a sparse database or dataset based on the synthetic database created by the database construction engine 104.

The data reconstruction engine 108 may be configured to train a model such as an autoencoder. The autoencoder is trained to map the arrays with missing data (the masked arrays), created by the data masking engine 106, back to the full array of data generated by the database construction engine 104. In other words, the data reconstruction engine 108 may fit a sparse database back to the original database. This model learns, in effect, to reconstruct or estimate the missing data based on data that is present in the masked data arrays. This represents the ability of the model to learn relationships between sensors. This allows sensors that are independent to be identified.

When the model is used as a search space, an optimal mask may be determined. The optimal mask allows an optimum set of sensors to be identified and deployed. More specifically, the model may be able to identify the sensors that are independent of each other. In other words, a trained model may be able to augment (e.g., estimate/reconstruct) data for sensors that are not deployed, missing, or inactive.

Figure 2:
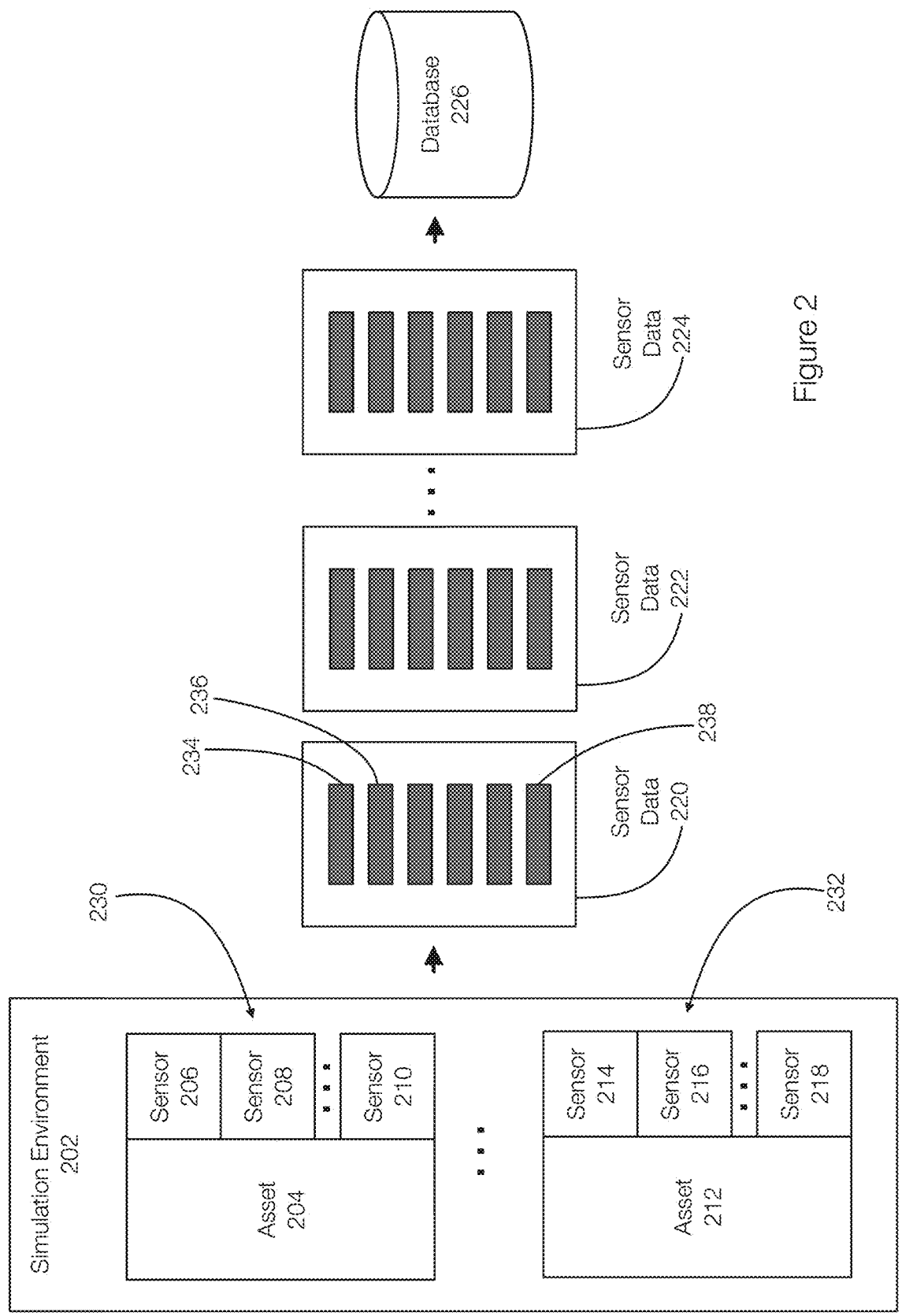
FIG. 2 discloses aspects of constructing a synthetic database.
Figure 3:
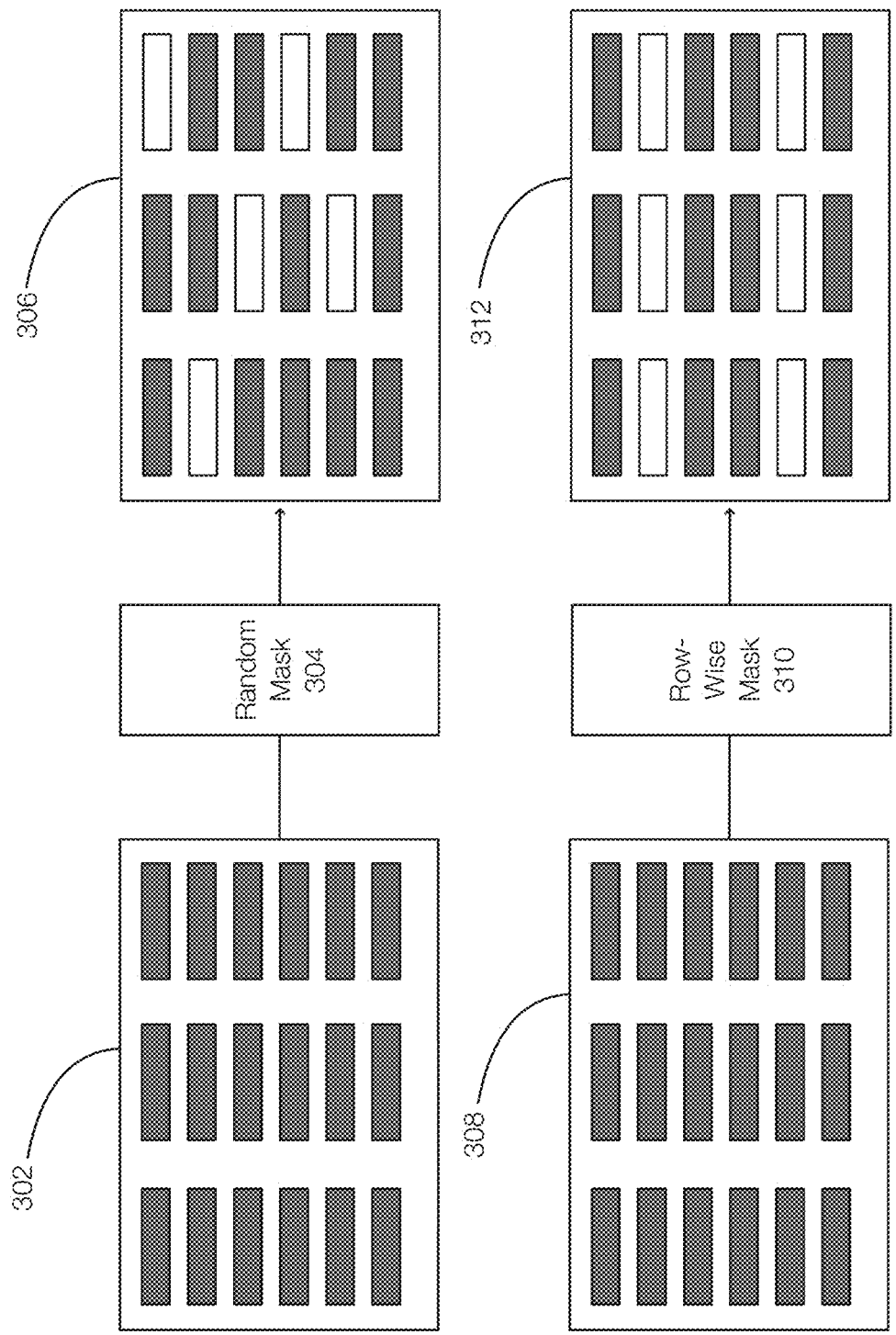
FIG. 3 discloses aspects of masking an example data array.
Figure 4:
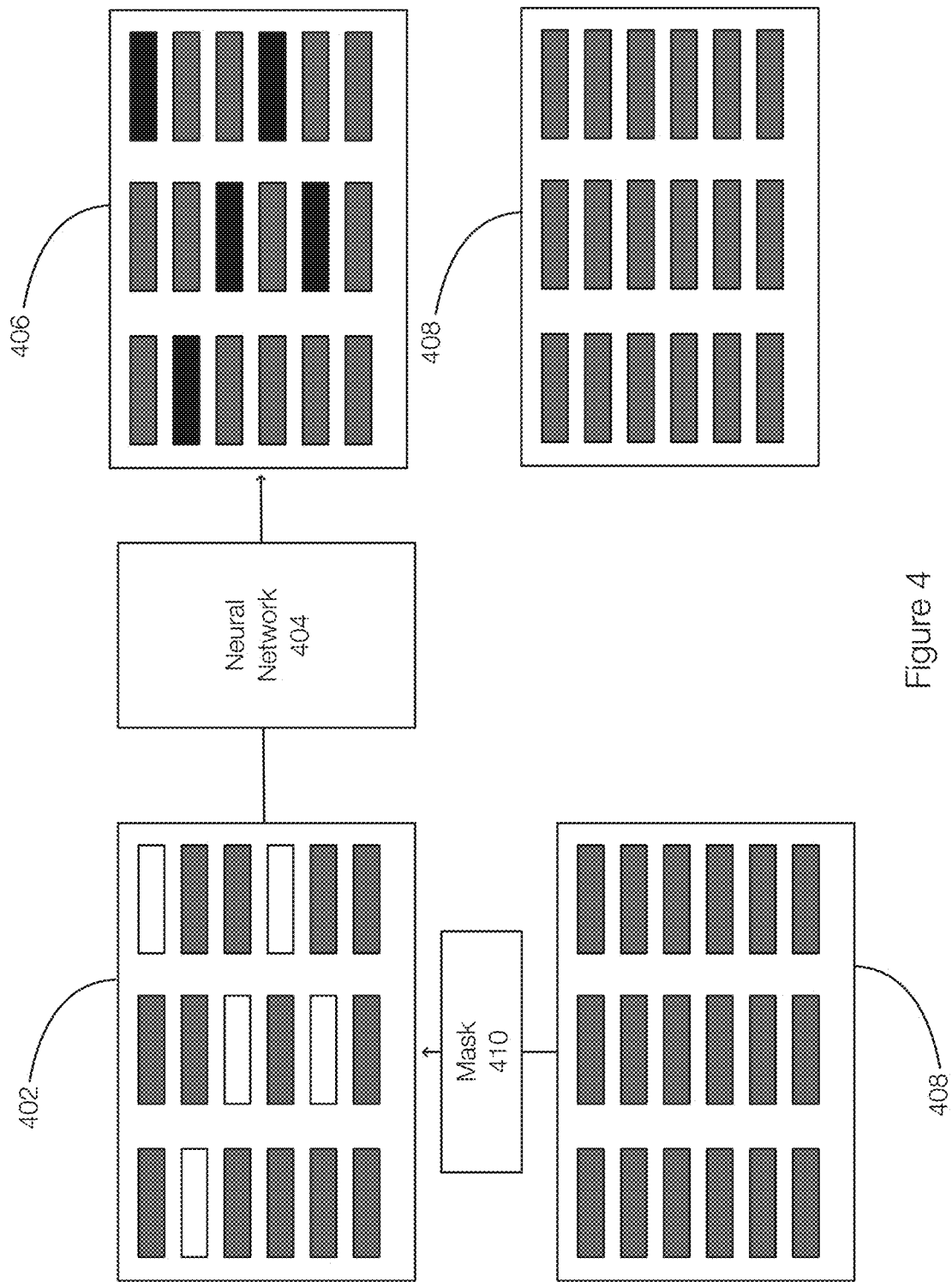
FIG. 4 discloses aspects of reconstructing a data array from a masked array of data.

FIGS. 2, 3, and 4 discloses additional aspects of the fitting stage. FIG. 2 discloses aspects of constructing a synthetic database, for example by the data construction engine 104. In FIG. 2, a simulation environment 202 (e.g., a digital twin) may be prepared or configured to simulate various assets (and/or their sensors), represented by the assets 204 and 212. The assets 204 and 212 may be the same or different asset types. In this example, the simulated asset 204 is instrumented with a simulated sensor array 230, which is represented by sensors 206, 208, and 210. Similarly, the asset 212 is instrumented with a sensor array 232 represented by sensors 214, 216, and 218.

The following example is discussed with respect to the asset 204. Data from other assets, however, can be added and analyzed/processed in a similar manner. During multiple simulations, data from the sensor array 230 are extracted (e.g., measured). In this example, the sensor data 220 includes data from a first simulation, the sensor data 222 represents data from a second simulation, and the sensor data 224 represents data from an $n^{th}$ simulation. The sensor data 220, 222, and 224 is stored in a database 226. The sensor data 220, which is an example of a data array, may store time series measurements.

In one example, data associated with the asset 204 may be handled differently from the data associated with the asset 212. Tor example, if the assets 204 and 212 are of different types or the sensor arrays 230 and 232 include at least some sensors that are different, embodiments of the invention may be applied to these assets individually. If the assets 204 and 212 are of the same type, the data may be merged in one example.

In this example, the database 226 stores synthetic data generated by simulations in a simulation environment 220. However, a database collected from real world sensors would also be suitable for use in embodiments of the invention. The following discussion relates to synthetic data that is sourced from a simulated environment. Examples of the simulated environment 202 includes Isaac Sim, Ansys, and Abaqus. Further, the asset 204 is instrumented with a robust sensor array in the simulated environment 202 in one example. In one example, all possible or available sensors for the asset 204 are simulated. The asset 204 is subjected to many virtual scenarios to represent a statistically relevant set of situations that may occur in the domain of operation.

In the data array represented by the sensor data 220, each row represents the acquisitions of a different sensor. For example, the data from the sensor 206 corresponds to row 234, data from the sensor 208 corresponds to row 236, and data from the sensor 210 corresponds to the row 238. Each of the data arrays of sensor data 220, 222, and 224 correspond to a different scenario executed in the simulation environment 202.

FIG. 3 discloses aspects of masking a data array and illustrates an example of a data masking engine configured to generate a masked array of sensor data. FIG. 3 illustrates example data arrays 302 and 308 of sensor data, which may be stored in the synthetic database 226. The arrays 302 and 308 are full or complete arrays and may correspond to data generated (or observed or collected) during a particular simulation, over a certain period of time, or the like. When a random mask 304 is applied to the array 302, a sparse array 306 is generated. As illustrated, random entries in the array 306 have been zeroed out (e.g., by randomly multiplying these entries by zero).

FIG. 3 further illustrates the application of a row-wise mask 310 to the data array 308, which is similar to the data array 302. In this example, the sparse array 312 generated by applying the row-wise mask 310 includes rows of entries that are zeroed out. In one example, the sparse array 312 may represent a scenario where certain sensors are missing or inactive or not installed. The rows zeroed out in the sparse array 312 may be randomly selected. The number of rows zeroed out may also be random.

FIG. 4 discloses aspects of a data reconstruction operation. In FIG. 4, a neural network 404 (e.g., representing a function ƒ(x)) is trained to reconstruct the original array 408 from a masked array 402. More specifically, a mask (random in this example) 410 is applied to an original array 408 to generate a masked or sparse array 402. A neural network 404 is trained to generate a reconstructed array 406 that is within an error threshold of the original array 408.

In one example, the neural network 404 is an autoencoder neural network that includes an encoder and a decoder. The encoder and decoder are trained in tandem to reduce the necessary information needed to represent the data (encoding) and to decode the encoded information to the original data. Other models that reconstruct data may be used.

When implemented in a data reconstruction engine, the neural network 404 (when trained) is able to complete (infer, estimate) the data missing from the sparse matrix 402 by learning the dependence between the measurements of the sensors.

Once a model (e.g., the neural network 404) is trained, the optimization stage 110 may be performed. The trained model may be used as a sensor optimization engine 112 (or optimization module) or may be used as a search space. More specifically, an optimization heuristic, such as a genetic algorithm, can be used in conjunction with the model to find a minimized or reduced set of sensors that allows for a sufficient reconstruction of unseen data. This may be achieved by iterating many masks proposed by the sensor optimization engine 112 through the model and evaluating the loss value until an optimal mask is identified. This process may be performed in an iterative manner. Each iteration may modify the mask such that the optimization stage converges towards a solution that minimizes the error of reconstruction while also minimizing the number of selected sensors.

Figure 5:
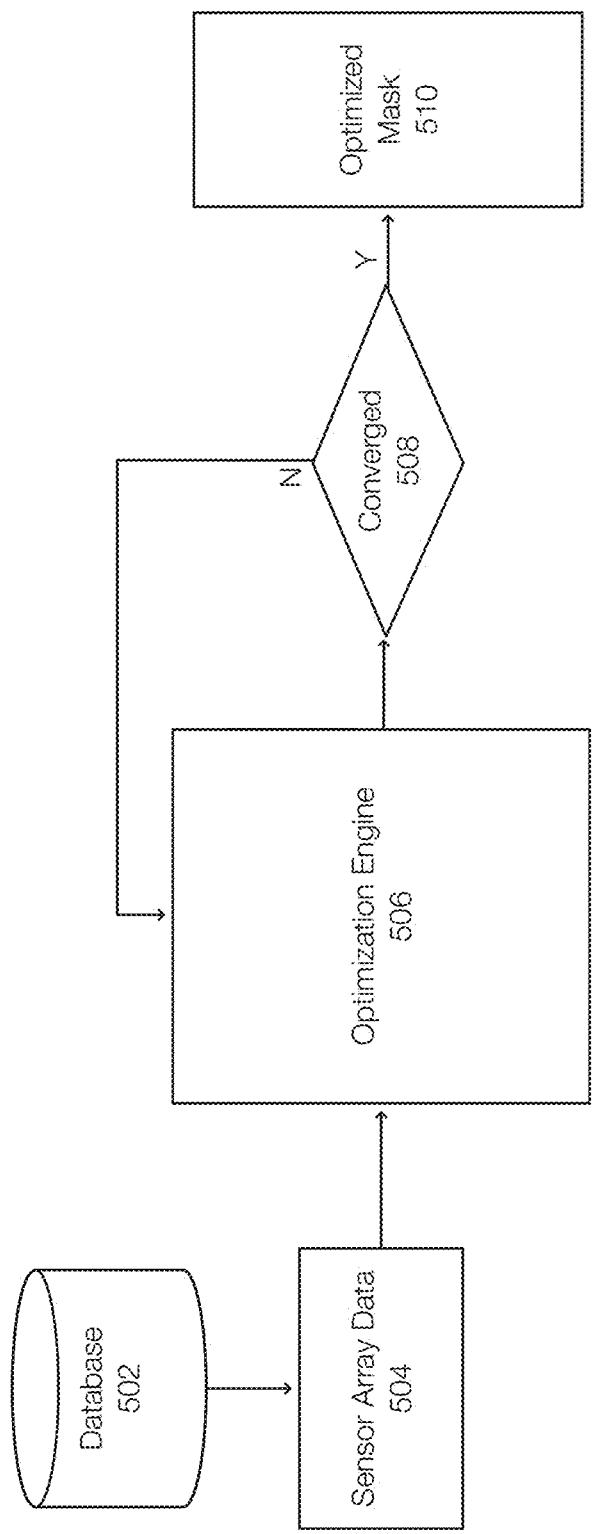
FIG. 5 discloses aspects of optimizing a data mask.

FIG. 5 discloses aspects of optimizing a data mask. The optimized mask may zero out specific rows of data. This suggests that the corresponding sensor is not strictly necessary as its data can be reconstructed from the data of other sensors. Embodiments of the invention thus all for minimal instrumentation while also providing data augmentation.

In FIG. 5, sensor array data 504 is retrieved from a database 502 (an example of the database 226). The sensor array data 504 is provided to an optimization engine 506. The optimization engine 506 may select simulated arrays included in the sensor array data 504 and perform optimization heuristics. The optimization engine 506 may select, for example, a mask using a heuristic such as a genetic algorithm, apply the mask to the sensor array data, and pass the masked sensor array data through the trained model. The resulting loss may be used to modify the mask.

In one example, loss is a measure of how the masked array (a subset of the sensors) is capable of representing an acquisition of all sensors. The loss may be used as a parameter to understand or evaluate how well the mask is performing in the context of selecting a subset of sensors that can best approximate all of or a larger set of sensors.

The loss may be used to modify the mask, in one example, by using the loss as an objective function of an optimization algorithm (e.g., a genetic algorithm). This heuristic may being with a population of randomly initialized row-wise masks and evaluate how these masks perform in selecting the subset of sensors that best approximate all other sensors in the reconstruction operation. As previously indicated, the loss is a measure of how the missing data (data from masked sensors) is reconstructed. This same algorithm or heuristic can also select and modify the best performing individuals of the initial population. For example, masks may be merged or randomly combined. The losses of the modified masks are reevaluated. This may occur iteratively until convergence is achieved. Convergence is achieved, in one example, when there is no more significant improvement in the loss value. In another example, an optimal row-wise mask may be identified using a simulated annealing algorithm. IN this example, one row-wise sparse mask is randomly generated and some positions of the zero rows are randomly changed at every iteration. The loss value is computed at every step and the algorithm can opt to pick the mask of the new loss which can be higher than the previous loss or not. The "willingness" of the algorithm to accept a new loss is based in a temperature parameter of the algorithm which decreases at every iteration (e.g., at the beginning a worse loss value can be accepted to explore a larger portion of the solution space). As iterations pass and the optimization process moves closer to the maximum number of iterations, the algorithm may be less included to discard a good solution in favor of a worse solution just to explore a wider portion of the solution space. This process may repeat until the loss converges (or for a specified number of iterations). When the loss converges (Y at 508), the mask is sufficiently optimized and may be deployed. If the loss is not sufficiently converged (N at 508), then the process of optimizing the mask repeats. Alternatively, the heuristic may select a set of masks that are expected to perform well and the optimal mask is selected from this set (e.g., after testing each of the masks). These masks may also be modified.

Figure 6:
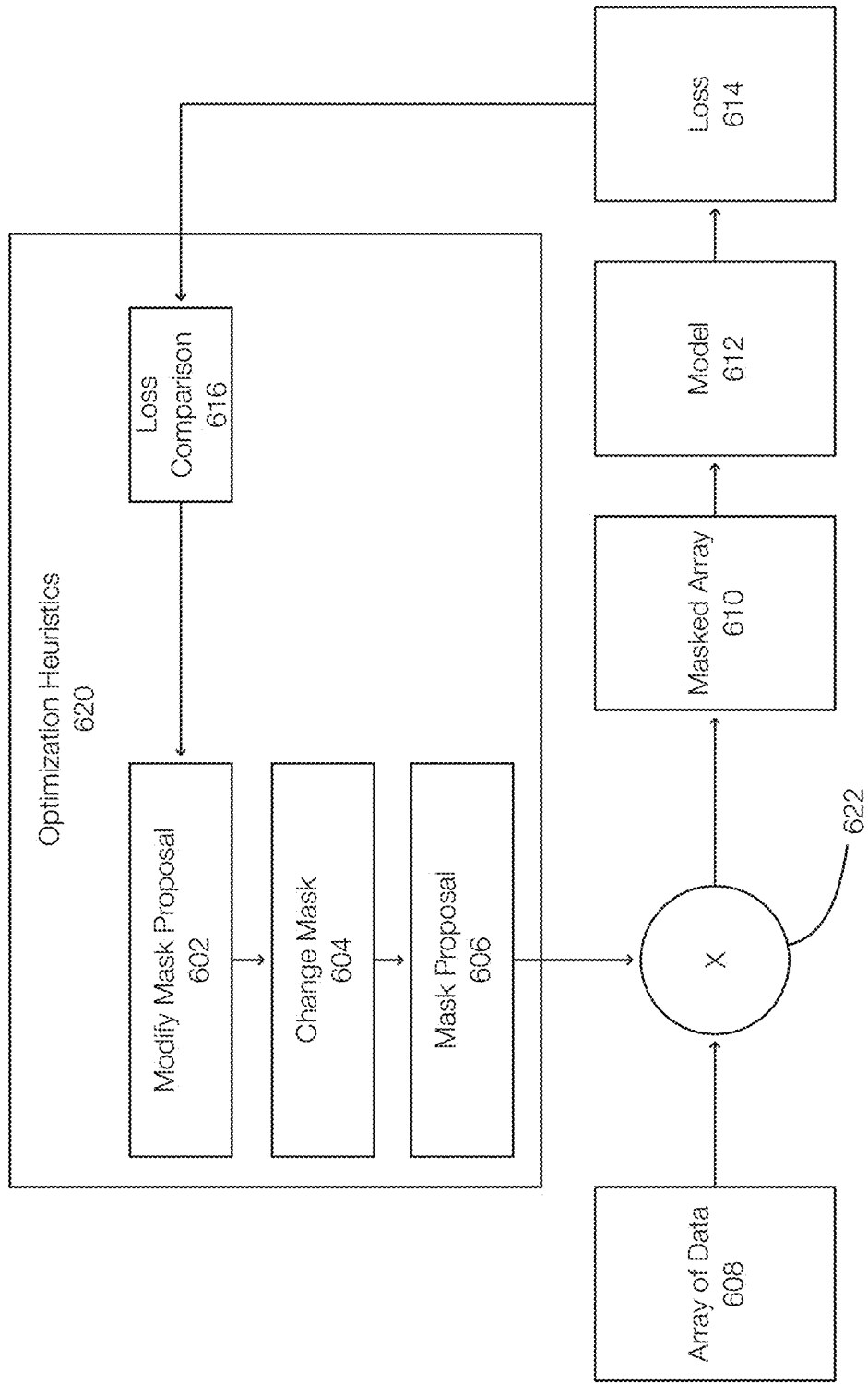
FIG. 6 discloses additional aspects of optimizing a data mask.

FIG. 6 discloses additional aspects of optimizing a data mask. The optimization loop performed by the optimization heuristics 620 may begin with a random mask, which may be set as an initial mask proposal 606. The mask proposal 606 is applied 622 to the array of data 608 to generate a masked array 610. The masked array 610 is input to the trained model 612. The output of the model 612 is used to determine a loss 614. The loss 614 represents a loss function between the original array and masked array (e.g., Loss(y, $f(x)$). The loss comparison 616 or loss 614 is used by the optimization heuristics 620 to modify 602 the mask proposal. Modifying 602 the mask proposal changes 604 the mask and produces a new mask proposal 606.

The new mask proposal 606 is applied to the array of data 608 to generate the masked array 610. As this optimization loop is repeated, the loss may converge such that an optimal mask is determined.

As the mask is modified by the optimization loop illustrated in FIG. 6, the output of the model 612 becomes a more accurate reconstruction of the original array of data 608 and optimizes the type and/or number of sensors required to reconstruct the data. In other words, the optimized mask identifies a set of sensors that best represents/reconstructs all the cases of the domain stored in the simulation database while also having a minimized or reduced number of active/installed sensors. In one example, the set of sensors corresponds to the rows that are not masked.

Thus, embodiments of the invention can identify an array of sensors that allows for a minimum or reduced cost of installation. Embodiments of the invention also reduce the costs of data acquisition and storage because only the sensors that produce datasets that are independent of each other may be installed or active. Further, embodiments of the approach do not restrict the use of a larger set of sensors. During deployment, the model may be configured to generate missing data (e.g., a sensor is temporarily offline), generate data for sensors that are inactive, and/or generate data for sensors that are not present.

Figure 7:
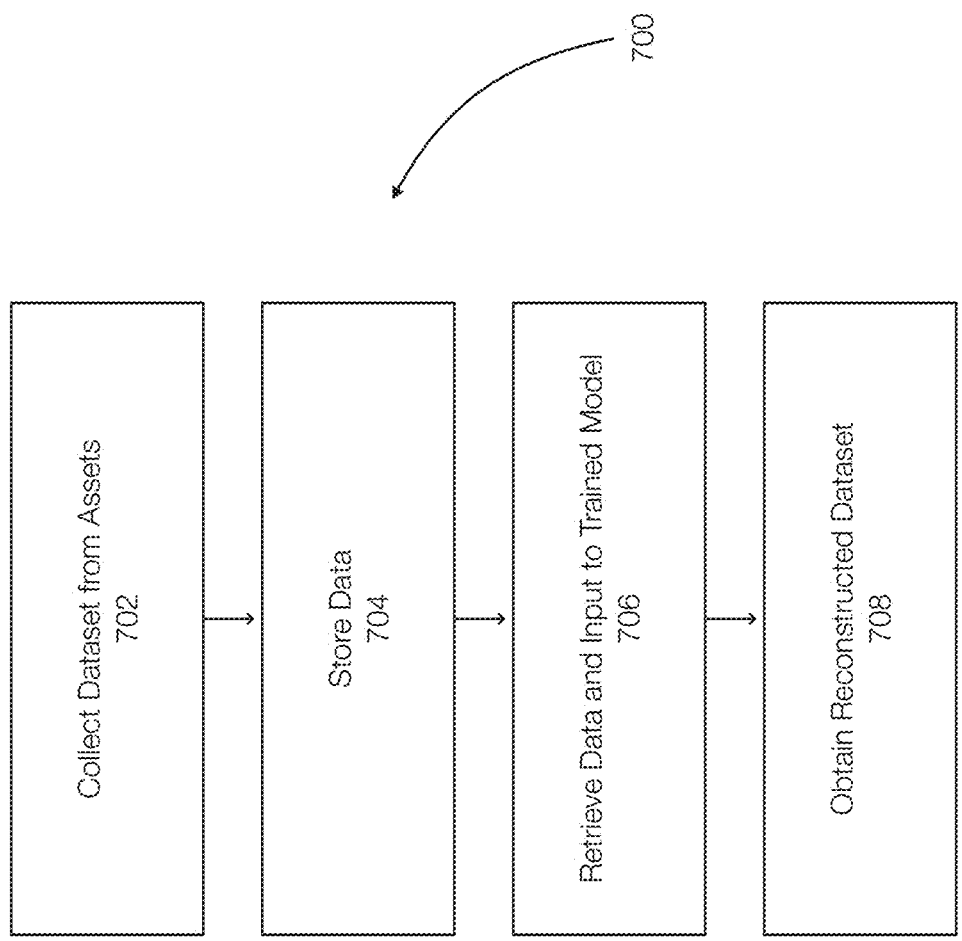
FIG. 7 discloses aspects of on-demand data generation.

FIG. 7 discloses aspects of a method for on-demand data generation. The method 700 includes steps or acts that may occur independently. The method 700 includes collecting 702 a data set from assets (or from sensors with which the assets are instrumented). The data may be stored 704 locally, in the cloud, or the like.

Next, the data that has been stored may be input 706 to a trained model. The model generates 708 an output that may include augmented (e.g., estimated/reconstructed/generated) data. The dataset output by the model may include an accurate estimate of data associated with missing and/or inactive sensors. This allows missing data to be generated or obtained on-demand from the augmented data.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data reconstruction operations, sensor array configuration operations, missing data operations, sensor selection operations, on-demand data estimation operations, or the like. More generally, the scope of the invention embraces any operating environment in which the disclosed concepts may be useful.

New and/or modified data collected and/or generated in connection with some embodiments, may be stored in a data environment that may take the form of a public or private cloud storage environment, an on-premises storage environment, and/or hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of at least collecting, modifying, reconstructing, and/or creating data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage components such as databases, storage servers, storage volumes (LUNs), storage disks, servers, or the like, for example, may likewise take the form of software, physical machines, containers, or virtual machines (VMs), though no particular component implementation is required for any embodiment.

Example embodiments of the invention are applicable to any system capable of storing and handling various types of objects, in analog, digital, or other form.

It is noted that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method, comprising: obtaining sensor data, wherein the sensor data is stored in a database, generating a data mask that is configured to mask original sensor data stored in the database to generate masked sensor data, training a model to reconstruct the original sensor data from the masked data, wherein reconstructed sensor data output by the trained model is within a threshold loss of the original sensor data, and using the model as a search space to identify a set of sensors with which to instrument an asset.

Embodiment 2. The method of embodiment 1, wherein the sensor data comprises real-world sensor data and/or synthetic sensor data generated in a virtual entity, wherein the synthetic sensor data comprises sensor arrays, each sensory array corresponding to a different simulation in the virtual entity, wherein each row in the sensor arrays corresponds to a different sensor.

Embodiment 3. The method of embodiment 1 and/or 2, wherein the data mask is a random data mask or a row-wise data mask.

Embodiment 4. The method of embodiment 1, 2, and/or 3, further comprising performing an optimization loop to determine an optimum mask when using the model as the search space.

Embodiment 5. The method of embodiment 1, 2, 3, and/or 4, wherein the optimization loop includes: selecting an initial mask and masking a sensor array of data selected from the database to generate a masked sensor array, inputting the masked sensor array into the model to generate an output sensor array, and determining a loss of the output sensor array compared to the sensor array.

Embodiment 6. The method of embodiment 1, 2, 3, 4, and/or 5, further comprising repeatedly: modifying the initial mask based on the loss and generating a mask proposal, applying the mask proposal to the sensor array of data to generate a new masked sensor array and inputting the new masked sensor array to the model to generate a new output sensor array, and determining a loss of the new output sensor array.

Embodiment 7. The method of embodiment 1, 2, 3, 4, 5, and/or 6, wherein the mask proposal is an optimal mask when the loss converges.

Embodiment 8. The method of embodiment 1, 2, 3, 4, 5, 6, and/or 7, wherein the set of sensors is determined by the optimal mask, wherein the set of sensors corresponds to sensors associated with the sensory array that are not masked by the optimal mask.

Embodiment 10. The method of embodiment 1, 2, 3, 4, 5, 6, 7, 8, and/or 9, wherein the initial mask is selected randomly or using a heuristic configured to identify a set of masks that are likely to have suitable performance.

Embodiment 11. The method of embodiment 1, 2, 3, 4, 5, 6, 7, 8, 9, and/or 10, wherein the optimal mask is configured to identify sensors whose data is independent of other sensors.

Embodiment 12. The method of embodiment 1, 2, 3, 4, 5, 6, 7, 8, 9, 10, and/or 11, further comprising generating data on-demand using the model, wherein the data on-demand corresponds to sensors that are missing, inactive, or not present.

Embodiment 13 A system, comprising hardware and/or software, operable to perform any of the operations, methods, or processes, or any portion of any of these, disclosed herein.

Embodiment 14 A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, engine, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
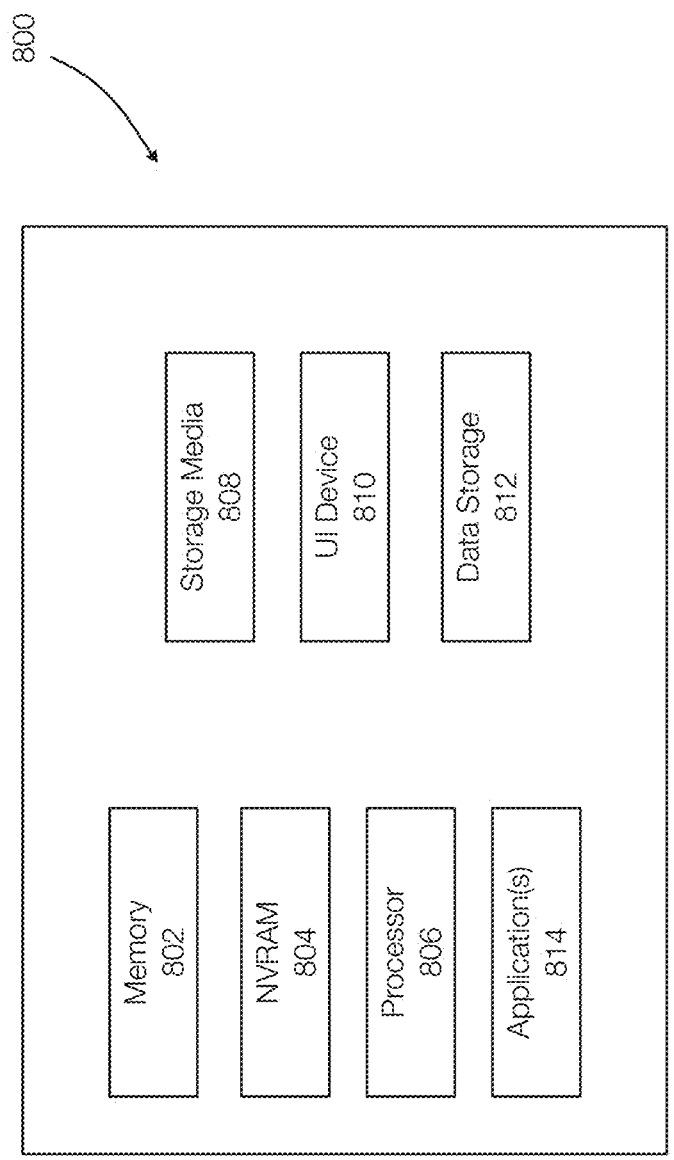
FIG. 8 discloses aspects of a computing device, system, or entity.

With reference briefly now to FIG. 8, any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 802 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
obtaining sensor data, wherein the sensor data is stored in a database;
generating a data mask that is configured to mask original sensor data stored in the database to generate masked sensor data; and
using a model as a search space to identify a set of sensors with which to instrument an asset, wherein the model is trained to reconstruct the original sensor data from the masked data, and wherein reconstructed sensor data output by the trained model is within a threshold loss of the original sensor data.

2. The method of claim 1, wherein the sensor data comprises real-world sensor data and/or synthetic sensor data generated in a virtual entity, wherein the synthetic sensor data comprises sensor arrays, each sensory array corresponding to a different simulation in the virtual entity, wherein each row in the sensor arrays corresponds to a different sensor.

3. The method of claim 1, wherein the data mask is a random data mask or a row-wise data mask.

4. The method of claim 1, further comprising performing an optimization loop to determine an optimum mask when using the model as the search space.

5. The method of claim 4, wherein the optimization loop includes:
selecting an initial mask and masking a sensor array of data selected from the database to generate a masked sensor array;
inputting the masked sensor array into the model to generate an output sensor array; and
determining a loss of the output sensor array compared to the sensor array.

6. The method of claim 5, further comprising repeatedly:
modifying the initial mask based on the loss and generating a mask proposal;
applying the mask proposal to the sensor array of data to generate a new masked sensor array and inputting the new masked sensor array to the model to generate a new output sensor array; and
determining a loss of the new output sensor array.

7. The method of claim 6, wherein the mask proposal is an optimal mask when the loss converges.

8. The method of claim 7, wherein the set of sensors is determined by the optimal mask, wherein the set of sensors corresponds to sensors associated with the sensory array that are not masked by the optimal mask.

9. The method of claim 7, wherein the initial mask is selected randomly or using a heuristic configured to identify a set of masks that are likely to have suitable performance.

10. The method of claim 7, wherein the optimal mask is configured to identify sensors whose data is independent of other sensors.

11. The method of claim 1, further comprising generating data on-demand using the model, wherein the data on-demand corresponds to sensors that are missing, inactive, or not present.

12. A non-transitory storage medium having stored therein instructions that are executable by one or more hardware processors to perform operations comprising:
obtaining sensor data, wherein the sensor data is stored in a database;
generating a data mask that is configured to mask original sensor data stored in the database to generate masked sensor data; and
using a model as a search space to identify a set of sensors with which to instrument an asset, wherein the model is trained to reconstruct the original sensor data from the masked data, and wherein reconstructed sensor data output by the trained model is within a threshold loss of the original sensor data.

13. The non-transitory storage medium of claim 12, wherein the sensor data comprises real-world sensor data and/or synthetic sensor data generated in a virtual entity, wherein the synthetic sensor data comprises sensor arrays, each sensory array corresponding to a different simulation in the virtual entity, wherein each row in the sensor arrays corresponds to a different sensor.

14. The non-transitory storage medium of claim 12, wherein the data mask is a random data mask or a row-wise data mask, further comprising performing an optimization loop to determine an optimum mask when using the model as the search space.

15. The non-transitory storage medium of claim 14, wherein the optimization loop includes:
    selecting an initial mask and masking a sensor array of data selected from the database to generate a masked sensor array;
    inputting the masked sensor array into the model to generate an output sensor array; and
    determining a loss of the output sensor array compared to the sensor array.

16. The non-transitory storage medium of claim 15, further comprising repeatedly:
    modifying the initial mask based on the loss and generating a mask proposal;
    applying the mask proposal to the sensor array of data to generate a new masked sensor array and inputting the new masked sensor array to the model to generate a new output sensor array; and
    determining a loss of the new output sensor array.

17. The non-transitory storage medium of claim 16, wherein the mask proposal is an optimal mask when the loss converges, wherein the set of sensors is determined by the optimal mask, wherein the set of sensors corresponds to sensors associated with the sensory array that are not masked by the optimal mask.

18. The non-transitory storage medium of claim 17, wherein the initial mask is selected randomly or using a heuristic configured to identify a set of masks that are likely to have suitable performance.

19. The non-transitory storage medium of claim 17, wherein the optimal mask is configured to identify sensors whose data is independent of other sensors.

20. The non-transitory storage medium of claim 12, further comprising generating data on-demand using the model, wherein the data on-demand corresponds to sensors that are missing, inactive, or not present.

* * * * *